United States Patent
Osawa et al.

(10) Patent No.: US 6,926,977 B2
(45) Date of Patent: Aug. 9, 2005

(54) MAGNETIC RECORDING MEDIUM, PRODUCTION PROCESS THEREOF, AND MAGNETIC RECORDING AND REPRODUCING APPARATUS

(75) Inventors: Hiroshi Osawa, Chiba (JP); Kenzo Hanawa, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 48 days.

(21) Appl. No.: 10/277,208

(22) Filed: Oct. 22, 2002

(65) Prior Publication Data

US 2003/0104253 A1 Jun. 5, 2003

Related U.S. Application Data

(60) Provisional application No. 60/330,595, filed on Oct. 25, 2001.

(30) Foreign Application Priority Data

Oct. 22, 2001 (JP) ................................... P2001-323165

(51) Int. Cl.$^7$ ............................... G11B 5/66; G11B 5/70
(52) U.S. Cl. ..................... 428/832.1; 428/829; 427/131
(58) Field of Search .............................. 428/829, 832.1, 428/694 TM, 694 TS, 900, 611, 668; 427/131

(56) References Cited

U.S. PATENT DOCUMENTS

| | | | | |
|---|---|---|---|---|
| 5,759,681 | A | * | 6/1998 | Hosoe et al. ............... 428/332 |
| 6,280,813 | B1 | * | 8/2001 | Carey et al. ................ 428/65.3 |
| 6,623,874 | B2 | * | 9/2003 | Kanbe et al. ........... 428/694 TS |
| 6,623,875 | B2 | * | 9/2003 | Inomata et al. ...... 428/694 TM |
| 2003/0148143 | A1 | * | 8/2003 | Kanbe et al. .......... 428/694 TS |
| 2004/0013910 | A1 | * | 1/2004 | Acharya et al. ....... 428/694 ST |

* cited by examiner

Primary Examiner—Holly Rickman
(74) Attorney, Agent, or Firm—Sughrue Mion, PLLC

(57) ABSTRACT

A magnetic recording medium having a non-magnetic substrate, a non-magnetic undercoat layer, a plurality of magnetic layers, and a protective film, is disclosed. At least one non-magnetic coupling layer is provided above the non-magnetic undercoat layer, a first magnetic layer is provided beneath the non-magnetic coupling layer and a second magnetic layer is provided atop the non-magnetic coupling layer, and the first magnetic layer is formed of a CoRu-based alloy, a CoRe-based alloy, a CoIr-based alloy, or a CoOs-based alloy.

12 Claims, 3 Drawing Sheets

*Prior Art*

MAGNETIC RECORDING MEDIUM, PRODUCTION PROCESS THEREOF, AND MAGNETIC RECORDING AND REPRODUCING APPARATUS

CROSS-REFERENCE TO RELATED APPLICATIONS

This application claims benefit of Provisional Application No. 60/330,595 filed Oct. 25, 2001, incorporated herein by reference, under 35 U.S.C. § 111(b) pursuant to 35 U.S.C. § 119(e) (1).

BACKGROUND OF THE INVENTION

1. Field of the Invention

The present invention relates to a magnetic recording medium which is employed in, for example, hard disk devices, to a process for producing the magnetic recording medium, and to a magnetic recording and reproducing apparatus. More particularly, the present invention relates to a magnetic recording medium exhibiting excellent recording and reproduction characteristics.

2. Background Art

The recording density of a hard disk device (HDD), which is a magnetic recording and reproducing apparatus, has increased by 60% per year, and this tendency is expected to continue. Therefore, magnetic recording heads and magnetic recording media which are suitable for attaining high recording density are now under development.

Magnetic recording media employed in hard disk devices are required to have high recording density, and therefore demand has arisen for improvement of coercive force and reduction of medium noise.

Most magnetic recording media employed in hard disk devices have a structure including a magnetic recording medium substrate on which a metallic film is laminated through sputtering. Aluminum substrates and glass substrates are widely employed for producing magnetic recording media. An aluminum substrate is produced through the following process: an NiP film (thickness: about 10 μm) is formed through electroless plating on an Al—Mg alloy substrate which has undergone mirror polishing, and the surface of the NiP film is subjected to mirror polishing. Glass substrates are classified into two types; i.e., amorphous glass substrate and glass ceramic substrate. When either of these two types of glass substrate is employed to produce a magnetic recording medium, the substrate is subjected to mirror polishing.

In general, a magnetic recording medium employed to produce a hard disk device includes a non-magnetic substrate; a non-magnetic undercoat layer (formed of, for example, NiAl, Cr, or a Cr alloy); a non-magnetic intermediate layer (formed of, for example, a CoCr alloy or a CoCrTa alloy); a magnetic layer (formed of, for example, a CoCrPtTa alloy or a CoCrPtB alloy); a protective film (formed of, for example, carbon), the layers and film being successively formed on the substrate; and a lubrication film containing a liquid lubricant formed on the protective film.

In order to increase recording density, signal to noise ratio (SNR) when recording is performed at high frequency must be enhanced. As described in "Magnetic Materials and Structures for Thin-Film Recording Media," Kenneth, E. J., JOURNAL OF APPLIED PHYSICS Vol. 87, No. 9, 5365 (2000), in order to enhance SNR, the diameters of crystal grains contained in a recording layer must be reduced and made uniform.

Meanwhile, as reported in "Temperature Dependence of Thermal Stability in Longitudinal Media," Sharat Batra et al., IEEE Trans. Magn. Vol. 35, No. 5, 2736 (1999), when the diameter of crystal grains contained in a recording layer is reduced, the volume of the crystal grains is reduced, and thus magnetization becomes thermally unstable. In order to enhance SNR of a magnetic recording medium, the diameter of crystal grains contained in a recording layer must be reduced. However, as a result, the volume of the crystal grains is reduced, and magnetization becomes thermally unstable.

Japanese Patent Application Laid-Open (kokai) No. 2001-56921 discloses a technique for solving the aforementioned problems, which employs antiferromagnetic coupling in a recording layer. This technique employs inverted magnetization of magnetic layers (i.e., recording layers) formed atop and beneath a non-magnetic coupling layer formed of, for example, ruthenium. Since the magnetization direction of the recording layer formed atop the non-magnetic coupling layer is opposite that of the recording layer formed beneath the coupling layer, a portion of each of the recording layers that participates in magnetic recording and reproduction has a thickness substantially smaller than the thickness of the recording layer. Therefore, SNR can be enhanced. Meanwhile, since the volume of crystal grains contained in the entirety of the recording layers becomes large, thermal stability of magnetization can be improved. Media employing such a technique are generally called "antiferromagnetically-coupled media (AFC media)" or "synthetic ferrimagnetic media (SFM)." In the present specification, such media will be called "AFC media."

FIGS. 5 and 6 show the structures of conventional AFC media. The AFC medium shown in FIG. 5 has a structure in which a non-magnetic coupling layer is sandwiched by two magnetic layers. The AFC medium shown in FIG. 6 has a structure in which a non-magnetic coupling layer and a magnetic layer are laminated on the layered structure as shown in FIG. 5 including two magnetic layers. In FIG. 5, reference numeral 501 denotes a non-magnetic substrate, 502 a non-magnetic undercoat layer, 503 a non-magnetic intermediate layer, 504 a first magnetic layer, 505 a non-magnetic coupling layer, 506 a second magnetic layer, 507 a protective film, and 508 a lubrication layer. In FIG. 6, reference numeral 601 denotes a non-magnetic substrate, 602 a non-magnetic undercoat layer, 603 a non-magnetic intermediate layer, 604 a first magnetic layer, 605 a non-magnetic coupling layer, 606 a second magnetic layer, 607 a non-magnetic coupling layer, 608 a third magnetic layer, 609 a protective film, and 610 a lubrication layer.

When magnetization of the first magnetic layer is represented by "M1," the volume of crystal grains contained in the first magnetic layer is represented by "V1," magnetization of the second magnetic layer is represented by "M2," and the volume of crystal grains contained in the second magnetic layer is represented by "V2," the entire volume of the magnetic layers becomes (V1+V2). Thus, when using two magnetic layers, the entire volume of the magnetic layers increases as compared to the use of a single magnetic layer, and therefore thermal stability is enhanced. However, the entire magnetization of the magnetic layers becomes (M2−M1); i.e., the entire magnetization of the magnetic layers decreases, and thus output of the magnetic layers serving as recording layers is lowered.

As reported in "Promising SFM (Synthetic Ferrimagnetic Media) Technology," Akira Kakeihi, Technical Conference, Session 2a, DISKCON USA2001, when the thickness of the first magnetic layer of the AFC medium shown in FIG. 5 is regulated to 5 nm, signal decay, which indicates thermal instability of the magnetic layer, is improved from −0.1 (dB/decade) to −0.025 (dB/decade), but magnetization of the magnetic layer is reduced from 0.37 (memu/cm$^2$) to 0.30 (memu/cm$^2$). The signal decay is manifested in the form of reduction in output of data with passage of time. The smaller the absolute value of the signal decay, the more thermally stable the magnetic layer becomes. Specifically, the signal decay (dB/decade) is represented by the slope of a line formed by plotting output (dB) along the vertical axis, and time along the horizontal axis (common-logarithmic coordinate). As described above, when thermal stability of an AFC medium is improved through conventional techniques, output of the AFC medium is lowered.

Meanwhile, in order to improve thermal stability of a conventional AFC medium, a first magnetic layer of the AFC medium must be thickened. When the thickness of the first magnetic layer is increased, magnetic coupling between magnetic layers provided atop and beneath a non-magnetic coupling layer becomes weak.

BRIEF SUMMARY OF THE INVENTION

In view of the foregoing, an object of the present invention is to provide a magnetic recording medium exhibiting improved thermal stability, suppressed lowering of output, high coercive force, and low noise, in which magnetic coupling between magnetic layers provided atop and beneath a non-magnetic coupling layer is strong. Another object of the present invention is to provide a process for producing the magnetic recording medium.

In order to solve the aforementioned problems, the present inventors have performed extensive studies, and have found that when a first magnetic layer is formed of a CoRu-based alloy, a CoRe-based alloy, a CoIr-based alloy, or a CoOs-based alloy,: even if the magnetic layer has a small thickness, the magnetic layer exhibits high coercive force and high squareness ratio, and an AFC medium exhibiting improved thermal stability without causing lowering of reproduction signal output can be produced. The present invention has been accomplished on the basis of this finding.

(1) A first aspect of the present invention provides a magnetic recording medium comprising a non-magnetic substrate, a non-magnetic undercoat layer, a plurality of magnetic layers, and a protective film, wherein at least one non-magnetic coupling layer is provided above the non-magnetic undercoat layer, a first magnetic layer is provided beneath the non-magnetic coupling layer and a second magnetic layer is provided atop the non-magnetic coupling layer, and the first magnetic layer is formed of an alloy selected from among a CoRu-based alloy, a CoRe-based alloy, a CoIr-based alloy, and a CoOs-based alloy.

(2) A second aspect of the present invention provides a magnetic recording medium according to (1), wherein the alloy constituting the first magnetic layer has a lattice constant a of 0.25 nm to 0.26 nm and a lattice contact c of 0.407 nm to 0.422 nm.

(3) A third aspect of the present invention provides a magnetic recording medium according to (1) or (2), wherein, in the alloy constituting the first magnetic layer, transition from an hcp structure to an fcc structure occurs at a temperature of at least 600° C.

(4) A fourth aspect of the present invention provides a magnetic recording medium according to any one of (1) through (3), wherein, when the first magnetic layer is formed of a CoRu-based alloy, the Ru content is 5 to 30 at %; when the first magnetic layer is formed of a CoRe-based alloy, the Re content is 5 to 30 at %; when the first magnetic layer is formed of a CoIr-based alloy, the Ir content is 8 to 30 at %; and when the first magnetic layer is formed of a CoOs-based alloy, the Os content is 5 to 30 at %.

(5) A fifth aspect of the present invention provides a magnetic recording medium according to any one of (1) through (4), wherein the first magnetic layer has a thickness of 0.5 to 3 nm.

(6) A sixth invention aspect of the present invention provides a magnetic recording medium according to any one of (1) through (5), wherein the non-magnetic coupling layer is formed of a substance selected from the group consisting of Ru, Rh, Ir, Cr, Re, an Ru-based alloy, an Rh-based alloy, an Ir-based alloy, a Cr-based alloy, and an Re-based alloy; and has a thickness of 0.5 to 1.5 nm.

(7) A seventh aspect of the present invention provides a magnetic recording medium according to any one of (1) through (6), which exhibits magnetic anisotropy in a circumferential direction of the non-magnetic substrate, wherein the non-magnetic undercoat layer has a multi-layer structure including a layer formed of Cr or a Cr alloy containing Cr and one or more elements selected from the group consisting of Ti, Mo, Al, Ta, W, Ni, B, Si, and V.

(8) An eighth aspect of the present invention provides a magnetic recording medium according to any one of (1) through (6), which exhibits magnetic isotropy along a longitudinal direction of the non-magnetic substrate, wherein the non-magnetic undercoat layer has a multi-layer structure including a layer formed of an NiAl-based alloy, an RuAl-based alloy, or a Cr alloy containing Cr and one or more elements selected from the group consisting of Ti, Mo, Al, Ta, W, Ni, B, Si, and V.

(9) A ninth aspect of the present invention provides a magnetic recording medium according to any one of (1) through (8), wherein the non-magnetic substrate is a substrate selected from the group consisting of a glass substrate and a silicon substrate.

(10) A tenth aspect of the present invention provides a magnetic recording medium according to any one of (1) through (8), wherein the non-magnetic substrate is obtained through NiP plating of the surface of a substrate selected from a group consisting of an Al substrate, a glass substrate, and a silicon substrate.

(11) An eleventh aspect of the present invention provides a magnetic recording medium according to any one of (1) through (10), wherein the second magnetic layer or a third magnetic layer is formed of an alloy selected from the group consisting of a CoCrPt-based alloy, a CoCrPtTa-based alloy, a CoCrPtB-based alloy, and a CoCrPtBY-based alloy, wherein Y is at least one element selected from the group consisting of Ta and Cu.

(12) A twelfth aspect of the present invention provides a process for producing a magnetic recording medium, which comprises a step of forming a non-magnetic undercoat layer on a non-magnetic substrate, a step of forming a magnetic layer, a step of forming a protective film, a step of forming at least one non-magnetic coupling layer above the non-magnetic undercoat layer; a step of forming a first magnetic layer containing an alloy selected from the group consisting of a CoRu-based alloy, a CoRe-based alloy, a CoIr-based alloy, and a CoOs-based alloy, the step of forming the first magnetic layer is performed before the step of forming at least one non-magnetic coupling layer; and a step of forming a second magnetic layer, after the step of forming the second magnetic layer being performed after the step of forming at least one non-magnetic coupling layer.

(13) A thirteenth aspect of the present invention provides a magnetic recording and reproducing apparatus comprising a magnetic recording medium and a magnetic head for recording data onto the medium and reproducing the data therefrom, wherein the magnetic recording medium is a magnetic recording medium as recited in any one of (1) through (11).

DETAILED DESCRIPTION OF THE INVENTION

Figure 1:
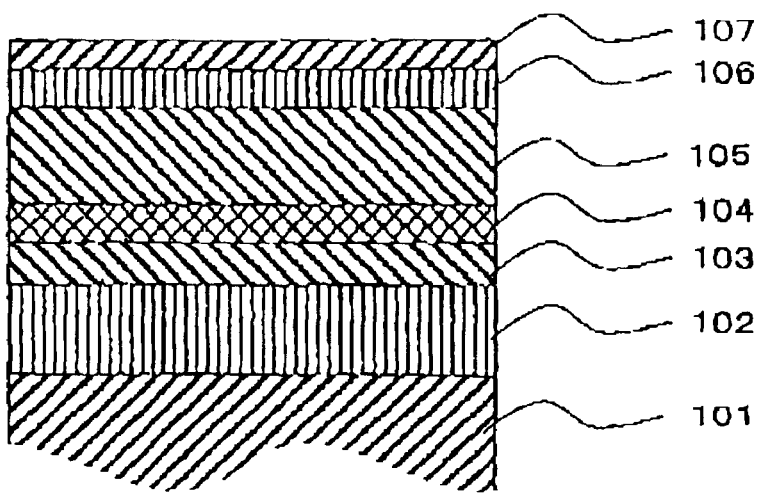
FIG. 1 is a cross-sectional view showing an embodiment of the magnetic recording medium of the present invention.

FIG. 1 shows an embodiment of the magnetic recording medium of the present invention. The magnetic recording medium includes a non-magnetic substrate 101; a non-magnetic undercoat layer 102; a first magnetic layer 103; a non-magnetic coupling layer 104; a second magnetic layer 105; a protective film 106; and a lubrication layer 107, these layers and film being successively formed on the substrate 101.

Figure 2:
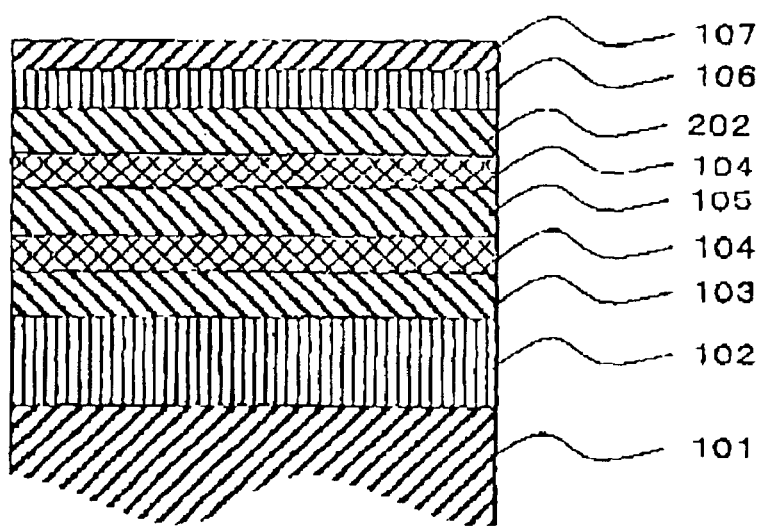
FIG. 2 is a cross-sectional view showing another embodiment of the magnetic recording medium of the present invention.

FIG. 2 shows another embodiment of the magnetic recording medium of the present invention. The magnetic recording medium has a structure in which a second non-magnetic coupling layer and third magnetic layer are laminated on the second magnetic layer shown in FIG. 1. The magnetic recording medium includes a non-magnetic substrate 101; a non-magnetic undercoat layer 102; a first magnetic layer 103; a non-magnetic coupling layer 104; a second magnetic layer 105; a second non-magnetic coupling layer 104; a third magnetic layer 202; a protective film 106; and a lubrication layer 107, these layers and film being successively formed on the substrate 101.

Examples of the non-magnetic substrate which may be employed in the present invention include an Al alloy substrate on which NiP film is formed through plating (hereinafter referred to as an "NiP-plated Al substrate"), which is generally employed as a substrate for producing a magnetic recording medium; a substrate formed of a non-metallic material such as glass, ceramic, silicon, silicon carbide, carbon, or resin; and a substrate obtained by forming NiP film or NiP alloy film on such a non-metallic substrate.

In association with an increase in recording density, demand has arisen for reduction in the flying height of a magnetic head, and thus the non-magnetic substrate is required to have high surface evenness. The non-magnetic substrate employed in the present invention preferably has an average surface roughness (Ra) of 2 nm (20 Å) or less, more preferably 1 nm or less.

From the viewpoints of cost and durability, the non-magnetic substrate is preferably a glass substrate (i.e., a non-metallic substrate). From the viewpoint of surface evenness, the non-magnetic substrate is preferably a glass substrate or a silicon substrate.

A glass substrate may be formed of glass ceramic or amorphous glass. Amorphous glass may be general-purpose glass such as soda-lime glass or aluminosilicate glass. Glass ceramic may be lithium-based glass ceramic. Glass ceramic exhibiting excellent chemical durability is preferred, since it can be employed in a variety of environments. Glass ceramic containing $SiO_2$ and $Li_2O$ as constitutive components is preferred, from the viewpoints of matching thermal expansion coefficient between a substrate formed of the glass ceramic and other parts when the substrate is incorporated in a drive device, and rigidity of the substrate when the device is assembled and used in practice.

A ceramic substrate may be formed of a general-purpose sintered compact predominantly containing aluminum oxide and silicon nitride; or of fiber-reinforced material thereof.

The non-magnetic undercoat layer is formed on the non-magnetic substrate. When the magnetic recording medium exhibits magnetic anisotropy in a circumferential direction of the non-magnetic substrate, the non-magnetic undercoat layer may be a layer formed of a Cr alloy containing Cr and one or more elements selected from among Ti, Mo, Al, Ta, W, Ni, B, Si, and V. The thickness of the Cr alloy layer is preferably 1 to 40 nm. When the magnetic recording medium exhibits magnetic isotropy along a longitudinal direction of the non-magnetic substrate, the non-magnetic undercoat layer may be a layer formed of an alloy having a B2 structure at ambient temperature, such as an NiAl-based alloy or an RuAl-based alloy; or a layer formed of a Cr alloy containing Cr and one or more elements selected from among Ti, Mo, Al, Ta, W, Ni, B, Si, and V. The thickness of the former layer or the latter layer is preferably 1 to 40 nm. When the thickness of such a layer is less than 1 nm, crystal growth proceeds insufficiently, whereas when the thickness exceeds 40 nm, crystal grains become excessively large, so that medium noise may increase.

The non-magnetic undercoat layer preferably has a multi-layer structure in which the aforementioned layers are laminated in arbitrary combinations. The overall thickness of the multi-layer structure is preferably 5 to 150 nm. When the non-magnetic undercoat layer has a multi-layer structure, crystal orientation becomes uniform, and excellent read-write conversion characteristics are obtained. For example, when the magnetic recording medium exhibits magnetic anisotropy in a circumferential direction of the non-magnetic substrate, preferably, the non-magnetic undercoat layer has a multi-layer structure including a Cr layer and a layer formed of a Cr alloy containing Cr and one or more elements selected from among Ti, Mo, Al, Ta, W, Ni, B, Si, and V, the Cr alloy layer being laminated on the Cr layer. When the magnetic recording medium exhibits magnetic isotropy along a longitudinal direction of the non-magnetic substrate, preferably, the non-magnetic undercoat layer has a multi-layer structure in which a layer formed of a Cr alloy containing Cr and one or more elements selected from among Ti, Mo, Al, Ta, W, Ni, B, Si, and V is laminated on a layer formed of an alloy having a B2 structure at ambient temperature, such as an NiAl-based alloy or an RuAl-based alloy.

In the magnetic recording medium of the present invention, at least one non-magnetic coupling layer is provided above the non-magnetic undercoat layer. Magnetic layers are provided atop and beneath the non-magnetic coupling layer. The magnetic layer provided beneath the non-magnetic coupling layer (i.e., the magnetic layer close to the non-magnetic substrate) is called a "first magnetic layer," and the magnetic layer provided atop the non-magnetic coupling layer is called a "second magnetic layer."

The non-magnetic coupling layer is formed of any substance selected from Ru, Rh, Ir, Cr, Re, an Ru-based alloy, an Rh-based alloy, an Ir-based alloy, a Cr-based alloy, and an Re-based alloy. Since these substances have a large exchange energy constant, when the non-magnetic coupling layer is formed of such a substance, the degree of inversion of magnetization of magnetic layers provided atop and beneath the non-magnetic coupling layer can be increased. The exchange energy constant represents the degree of exchange interaction between magnetic layers provided atop and beneath the non-magnetic coupling layer. Therefore, a substance having large exchange energy constant is preferred. Particularly preferably, the non-magnetic coupling layer is formed of Ru, since Ru has the largest exchange energy constant of all the aforementioned substances.

The thickness of the non-magnetic coupling layer is preferably 0.2 to 1.5 nm, more preferably 0.6 to 1.0 nm. When the thickness falls within the above range, sufficient antiferromagnetic coupling is obtained. Examples of Ru-based alloys include RuCo, RuCr, RuNb, RuTa, and RuW. Examples of Rh-based alloys include RhCo, RhCr, and RhTa. Examples of Ir-based alloys include IrCo, IrCr, and IrTa. Examples of Cr-based alloys include CrCo. Examples of Re-based alloys include ReCo, ReCr, and ReTa.

Since the first magnetic layer is formed of any alloy selected from among a CoRu-based alloy, a CoRe-based alloy, a CoIr-based alloy, and a CoOs-based alloy, the first magnetic layer can be provided directly on the non-magnetic undercoat layer without provision of a non-magnetic intermediate layer, which is preferable.

In a conventional magnetic recording medium, epitaxial growth of a magnetic layer is promoted by providing a non-magnetic intermediate layer beneath the magnetic layer. Conventionally, a non-magnetic undercoat layer has been formed of a substance having an fcc structure similar to that of Cr or a Cr alloy, or a substance having a B2 structure instead of an hcp structure, such as NiAl or RuAl. However, when a magnetic layer is formed directly on a film of non-hcp structure, initial growth of the magnetic layer proceeds unsuccessfully, and crystal orientation of a portion of the magnetic layer that is grown at an initial stage is impaired. Therefore, crystal orientation of the magnetic layer at an initial growth stage has been improved by forming a non-magnetic intermediate layer from a substance having an hcp structure, such as CoCr.

In the present invention, the first magnetic layer is formed of any alloy selected from among a CoRu alloy, a CoRe alloy, a CoIr alloy, and a CoOs alloy, on the basis of the following finding: when a magnetic layer is formed of such an alloy, even if the magnetic layer is provided directly on a layer of non-hcp structure, the magnetic layer can maintain excellent crystal orientation from its initial growth stage.

An element such as Cr, Pt, B, or Cu is added to a conventionally employed magnetic layer formed of a substance such as a CoCrPtB alloy, a CoCrPtTa alloy, or a CoCrPtBCu alloy, in order to form grain boundaries for satisfactorily separating magnetic grains from one another. However, since the magnetic grains have an hcp structure and grain boundary portions formed through addition of an element such as Cr, Pt, B, or Cu have a non-hcp structure, growth of the hcp structure of the magnetic grains is impeded. A CoRu alloy, a CoRe alloy, a CoIr alloy, or a CoOs alloy, which is employed for forming the first magnetic layer of the magnetic recording medium of the present invention, has an hcp structure. When the Co content of such an alloy falls within a preferred range, the entirety of the alloy forms a solid solution, and the alloy has a pure hcp structure. Therefore, when the first magnetic layer is formed of such an alloy, even if the magnetic layer is provided directly on a layer of non-hcp structure, the magnetic layer can maintain excellent crystal orientation from its initial growth stage. The ratio between the a-axis and the c-axis of the hcp structure of Re is 1.61, which is virtually equal to the ratio between the a-axis and the c-axis of the hcp structure of Co; i.e., 1.62. Since the second magnetic layer is formed of a Co alloy, from the viewpoint of epitaxial growth of the first and second magnetic layers, the first magnetic layer is particularly preferably formed of a CoRe alloy.

Preferably, the alloy constituting the first magnetic layer has an hcp structure, and has a lattice constant a of 0.250 nm to 0.260 nm (more preferably 0.252 to 0.257 nm) and a lattice contact c of 0.407 nm to 0.422 nm (more preferably 0.410 to 0.419 nm). Co has an hcp structure and has a lattice constant a of 0.251 nm and a lattice constant c of 0.407 nm. When Pt is added to a Co alloy employed in the second magnetic layer or the third magnetic layer in order to increase coercive force and improve SNR, the lattice constants a and c of the Co alloy become large. When Pt is added in a preferred amount of 8 to 16 at %, the lattice constant a and c of the Co alloy become 0.255 to 0.260 nm and 0.413 to 0.422 nm, respectively. The degree of lattice matching between the alloy constituting the first magnetic layer and the Co alloy employed in the second or third magnetic layer is preferably about 0 to about 2%. Therefore, in order to establish good lattice matching between the CoRu-based alloy, CoRe-based alloy, CoIr-based alloy, or CoOs-based alloy constituting the first magnetic layer and the Co alloy employed in the second magnetic layer to which Pt has been added, the alloy constituting the first magnetic layer preferably has the aforementioned lattice constants a and c. Lattice matching can be calculated on the basis of the following equation: (lattice constant of the Co alloy employed in the second or third magnetic layer−lattice constant of the Co alloy constituting the first magnetic layer)÷(lattice constant of the Co alloy employed in the second or third magnetic layer)×100 (%).

In the alloy constituting the first magnetic layer, the temperature at which transition from an hcp structure to an fcc structure occurs (hereinafter called "hcp-fcc transition temperature") is preferably at least 600° C. In general, when a magnetic layer is formed on a non-magnetic substrate, the non-magnetic substrate is heated to 150° C. to 300° C. Since atoms sputtered during film formation have an energy of about 10 eV, when such atoms impact on the non-magnetic substrate to thereby form a film, the temperature of the substrate is thought to increase to a temperature higher than the above temperature. In Co, transition from an hcp structure to an fcc structure occurs at 422° C. Therefore, when the non-magnetic substrate is heated to such a high temperature, in a Co alloy employed for film formation, partial transition from an hcp structure to an fcc structure may occur. When the amount of an fcc structure increases, epitaxial growth of the Co alloy is impeded, resulting in lowering of output and SNR. In order to reduce the amount of an fcc structure, the hcp-fcc transition temperature is preferably increased to at least 600° C. Preferably, Ru, Re, Ir, or Os is added, to thereby increase the hcp-fcc transition temperature.

The Ru content of a CoRu-based alloy is preferably 5 to 30 at %, more preferably 15 to 25 at %. The Re content of a CoRe-based alloy is preferably 5 to 30 at %, more preferably 15 to 25 at %. The Ir content of a CoIr-based alloy is preferably 8 to 30 at %, more preferably 15 to 25 at %. The Os content of a CoOs-based alloy is preferably 5 to 30 at %, more preferably 15 to 25 at %.

When the Ru content is less than 5 at %, when the Re content is less than 5 at %, when the Ir content is less than 8 at %, or when the Os content is less than 5 at %, the hcp-fcc transition temperature becomes 600° C. or lower. When the Ru content, the Re content, the Ir content, or the Os content is 30 at % or more, the lattice constant a of the Co alloy may exceed 0.26 nm, and thus lattice matching may fail to be established.

The CoRu-based alloy layer, CoRe-based alloy layer, CoIr-based alloy layer, or CoOs-based alloy layer constituting the first magnetic layer preferably has a thickness of 0.5 to 3 nm. When the thickness is less than 0.5 nm, epitaxial growth proceeds insufficiently, and difficulty is encountered in obtaining high coercive force. In contrast, when the thickness exceeds 3 nm, reproduction signal output may be lowered as a result of antiferromagnetic coupling.

The second, third or more magnetic layer may be formed of a Co alloy predominantly containing Co and having an hcp structure. For example, the second or third magnetic layer may contain any alloy selected from among a CoCrTa-based alloy, a CoCrPt-based alloy, a CoCrPtTa-based alloy, a CoCrPtBTa-based alloy, and a CoCrPtBCu-based alloy.

When a CoCrPt-based alloy is employed, preferably, the Cr content is 10 to 25 at %, and the Pt content is 8 to 16 at %, from the viewpoint of SNR.

When a CoCrPtB-based alloy is employed, preferably, the Cr content is 10 to 25 at %, the Pt content is 8 to 16 at %, and the B content is 1 to 20 at %, from the viewpoint of SNR.

When a CoCrPtBTa-based alloy is employed, preferably, the Cr content is 10 to 25 at %, the Pt content is 8 to 16 at %, the B content is 1 to 20 at %, and the Ta content is 1 to 4 at %, from the viewpoint of SNR.

When a CoCrPtBCu-based alloy is employed, preferably, the Cr content is 10 to 25 at %, the Pt content is 8 to 16 at %, the B content is 2 to 20 at %, and the Cu content is 1 to 4 at %, from the viewpoint of SNR.

When the magnetic recording medium includes merely the first and second magnetic layers, the thickness of the second magnetic layer is preferably at least 15 nm, from the viewpoint of suppression of thermal instability. Meanwhile, from the viewpoint of high recording density, the thickness of the second magnetic layer is preferably 40 nm or less. When the thickness exceeds 40 nm, preferred recording and reproduction characteristics may fail to be obtained.

When the magnetic recording medium includes the first, second, and third magnetic layers, the thickness of the third magnetic layer is preferably at least 15 nm, from the viewpoint of suppression of thermal instability. Meanwhile, from the viewpoint of high recording density, the thickness of the third magnetic layer is preferably 40 nm or less. When the thickness exceeds 40 nm, preferred recording and reproduction characteristics fail to be obtained. In this case, the thickness of the second magnetic layer is preferably 2 to 10 nm. When the thickness is less than 2 nm, satisfactory magnetization fails to be attained, whereas when the thickness exceeds 10 nm, difficulty is encountered in obtaining strong antiferromagnetic coupling.

By means of the non-magnetic coupling layer, magnetic coupling is established between the magnetic layers provided atop and beneath the non-magnetic coupling layer. Exchange coupling strength (Hex) is employed as an index for expressing the degree of magnetic coupling. The magnetic recording medium of the present invention has an Hex of at least 800 Oe.

Hex is represented by the magnetic field intensity defined as the distance between magnetic field zero and the center point of a minor loop on which coercive force of the magnetic recording medium is determined. When Hex is high, strong, stable magnetic coupling is established between the magnetic layers provided atop and beneath the non-magnetic coupling layer. In order to obtain the minor loop, a magnetization curve is drawn by firstly increasing the intensity of a magnetic field applied to the magnetic recording medium from zero to the maximum value (e.g., 10,000 Oe), secondly reducing the magnetic field intensity from the maximum value (e.g., 10,000 Oe) to a value (e.g., –3,000 Oe), which is higher, by about 1,000 Oe, than a magnetic field intensity at which magnetization is decreased in the fourth quadrant, and finally increasing the magnetic field intensity from –3,000 Oe to 10,000 Oe. The minor loop corresponds to a portion of the magnetization curve that is located in the first quadrant.

When the magnetic layer contains B, preferably, the Cr content of a region in the vicinity of the boundary between the non-magnetic undercoat layer and the magnetic layer, in which the B content is at least 1 at %, is 40 at % or less. When the Cr content is 40 at % or less, coexistence of Cr and B of high concentration can be prevented, whereby the amount of a covalently bonded compound formed from Cr and B can be reduced to a possibly minimum level, thereby preventing deterioration of crystal orientation of the magnetic layer resulting from formation of such a compound.

Figure 3:
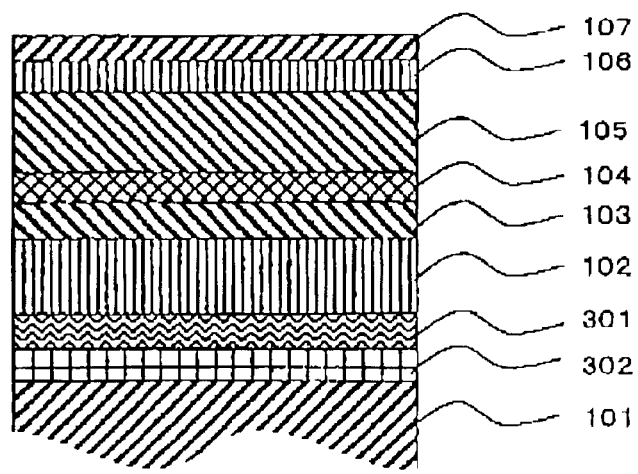
FIG. 3 is a cross-sectional view showing yet another embodiment of the magnetic recording medium of the present invention.

An orientation-regulating film formed of a metallic material for promoting epitaxial growth of the non-magnetic undercoat layer may be provided between the substrate and the non-magnetic undercoat layer. The thickness of the orientation-regulating film is preferably 5 to 50 nm, from the viewpoint of promotion of epitaxial growth. In order to enhance adhesion between the substrate and the orientation-regulating film, an adhesive layer may be provided between the non-metallic substrate and the orientation-regulating film. The adhesive layer may be formed of any material selected from among Cr, Ti, and W. The thickness of the adhesive layer is preferably 1 to 100 nm, more preferably 5 to 80 nm, much more preferably 7 to 70 nm, from the viewpoints of adhesion and productivity. FIG. 3 shows a magnetic recording medium including an orientation-regulating film 301 and an adhesive layer 302.

The protective film may be formed of a conventionally known material; for example, a material containing a single component such as carbon or SiC, or a material predominantly containing such a component. The thickness of the protective film is preferably 1 to 10 nm, from the viewpoint of spacing loss or durability when employed at high recording density.

If desired, a lubrication layer formed of a conventionally known material such as a fluorine-based lubricant (e.g., perfluoropolyether) may be provided on the protective film.

The non-magnetic substrate may have texture lines formed on the surface thereof through texturing. Texturing is preferably carried out such that the average surface roughness of the substrate having texture lines is preferably 0.1 nm to 0.7 nm, more preferably 0.1 nm to 0.5 nm, much more preferably 0.1 nm to 0.35 nm. Preferably, texture lines are formed so as to run along virtually a circumferential direction of the substrate, from the viewpoint of enhancement of magnetic anisotropy of the magnetic recording medium in a circumferential direction thereof.

The texturing process may include oscillation. The term "oscillation" refers to a process in which a tape is caused to travel in a circumferential direction of the substrate while the tape is reciprocated in a radial direction of the substrate. Preferably, oscilation is performed at a rate of 60 to 1,200 times/minute, so that the surface of the substrate is uniformly abraded through texturing.

Examples of the texturing process which may be employed include a process in which texture lines having a line density of at least 7,500 lines/mm are formed, a mechanical texturing process employing the aforementioned tape, a process employing fixed abrasive grains, a process employing a fixed grinding stone, and a process employing laser abrasion.

The magnetic recording medium of the present invention includes a non-magnetic undercoat layer; at least one non-magnetic coupling layer provided above the non-magnetic undercoat layer; and magnetic layers provided atop and beneath the non-magnetic coupling layer, wherein a first magnetic layer (i.e., a magnetic layer close to the non-magnetic substrate) is formed of an alloy selected from among a CoRu-based alloy, a CoRe-based alloy, a CoIr-based alloy, and a CoOs-based alloy. Therefore, the magnetic recording medium exhibits improved thermal stability, suppressed lowering of output, high coercive force, and low noise, in which magnetic coupling between the magnetic layers provided atop and beneath the non-magnetic coupling layer is strong. That is, the magnetic recording medium is suitable for attaining high recording density.

Figure 4:
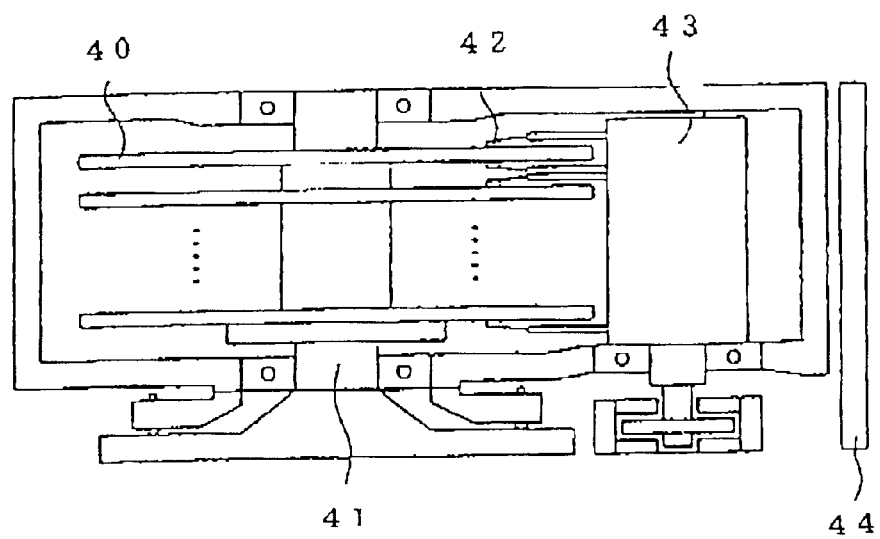
FIG. 4 is a schematic representation showing an embodiment of the magnetic recording and reproducing apparatus including the magnetic recording medium of the present invention.
Figure 5:
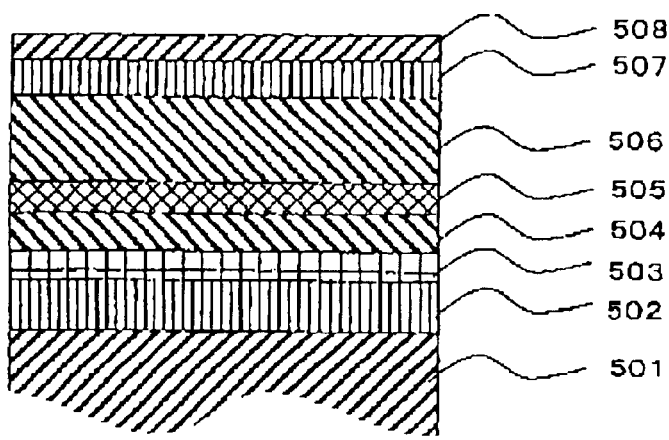
FIG. 5 is a cross-sectional view showing an example of a conventional AFC medium including two magnetic layers.
Figure 6:
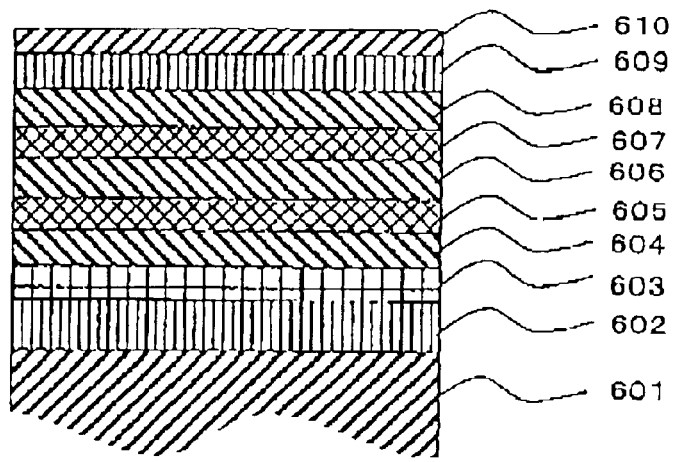
FIG. 6 is a cross-sectional view showing an example of a conventional AFC medium including three magnetic layers.

FIG. 4 shows an embodiment of the magnetic recording and reproducing apparatus including the aforementioned magnetic recording medium. The magnetic recording and reproducing apparatus shown in FIG. 4 includes a magnetic recording medium 40 having a structure as shown in any one of FIGS. 1 through 3; a medium-driving section 41 which rotates the medium 40; a magnetic head 42 which is employed for recording of data onto the medium 40 and for reproduction of the data therefrom; a head-driving section 43 which drives the magnetic head 42 relative to the magnetic recording medium 40; and a recorded/reproduced-signal-processing system 44. In the recorded/reproduced-signal-processing system 44, input data are processed and recording signals are sent to the magnetic head 42, or reproduction signals from the head 42 are processed and the resultant data are output. The magnetic recording and reproducing apparatus of the present invention may employ, as the magnetic head 42, a head suitable for high recording density containing a reproduction element such as an anisotropic magnetoresistive (AMR) element or a giant magnetoresistive (GMR) element.

The aforementioned magnetic recording and reproducing apparatus includes the magnetic recording medium including a non-magnetic undercoat layer; at least one non-magnetic coupling layer provided above the non-magnetic undercoat layer; and magnetic layers provided atop and beneath the non-magnetic coupling layer, wherein a first magnetic layer (i.e., a magnetic layer close to the non-magnetic substrate) is formed of an alloy selected from among a CoRu-based alloy, a CoRe-based alloy, a CoIr-based alloy, and a CoOs-based alloy. Therefore, the magnetic recording and reproducing apparatus is suitable for attaining high recording density.

An embodiment of the production process of the present invention will next be described.

The non-magnetic substrate is formed of an Al alloy substrate on which NiP film is formed through plating (hereinafter referred to as an "NiP-plated Al substrate"), which is generally employed as a substrate for producing a magnetic recording medium; a substrate formed of a non-metallic material such as glass, ceramic, silicon, silicon carbide, carbon, or resin; or a substrate obtained by forming NiP film or NiP alloy film on such a non-metallic substrate.

The average surface roughness (Ra) of the non-magnetic substrate is preferably 2 nm (20 Å) or less, more preferably 1 nm or less.

The micro-waviness (Wa) of the surface of the non-magnetic substrate is preferably 0.3 nm or less, more preferably 0.25 nm or less. From the viewpoint of flying stability of the magnetic head, the average surface roughness (Ra) of at least one of an edge portion and a side portion of a chamfer section of the end surface of the substrate is preferably 10 nm or less, more preferably 9.5 nm or less. The micro-waviness (Wa) can be obtained as an average surface roughness as measured within a measurement range of 80 µm by use of, for example, a surface roughness measurement apparatus P-12 (product of KLM-Tencor).

If desired, the surface of the non-magnetic substrate is subjected to texturing. Subsequently, the non-magnetic substrate is washed, and the resultant substrate is placed in a chamber of a film formation apparatus. If desired, the substrate is heated to 100 to 400° C. by use of, for example, a heater.

Above the non-magnetic substrate 101, the non-magnetic undercoat layer 102, the non-magnetic coupling layer 104, and the magnetic layers 103, 105 are formed through DC or RF magnetron sputtering by use of sputtering targets containing materials having the same compositions as the respective layers. In this case, before formation of the non-magnetic coupling layer, the first magnetic layer is formed of an alloy selected from among a CoRu-based alloy, a CoRe-based alloy, a CoIr-based alloy, and a CoOs-based alloy, and the second magnetic layer is formed after formation of the non-magnetic coupling layer. The third magnetic layer is formed after formation of a second non-magnetic coupling layer.

Sputtering for forming the respective layers is carried out under, for example, the following conditions. The chamber employed for forming the layers is evacuated to $10^{-4}$ to $10^{-7}$ Pa. The substrate is placed in the chamber, a sputtering gas (e.g., Ar gas) is introduced into the chamber, and discharging is carried out, to thereby form the layers through sputtering. During sputtering, power to be applied is regulated to 0.2 to 2.0 kW. When the discharging time and the power to be applied are regulated, the layers can be formed to desired thicknesses.

The non-magnetic undercoat layer (thickness: 5 to 15 nm) is formed by use of a sputtering target containing a substance selected from among Cr, a Cr alloy, NiAl, and RuAl.

Subsequently, the first magnetic layer (thickness: 0.5 to 3 nm) is formed by use of a sputtering target containing, as a raw material, an alloy selected from among a CoRu-based alloy, a CoRe-based alloy, a CoIr-based alloy, and a CoOs-based alloy.

Subsequently, the non-magnetic coupling layer (thickness: 0.2 to 1.5 nm, preferably 0.6 to 1.0 nm) is formed by use of a sputtering target containing a substance selected from among Ru, Rh, Ir, Cr, Re, an Ru-based alloy, an Rh-based alloy, an Ir-based alloy, a Cr-based alloy, and an Re-based alloy.

Subsequently, the second magnetic layer (thickness: 15 nm to 40 nm) is formed by use of a sputtering target containing an alloy selected from among a CoCrPt-based alloy, a CoCrPtTa-based alloy, a CoCrPtB-based alloy, and a CoCrPtBY-based alloy (wherein Y is at least one element selected from among Ta and Cu).

In the case where the third magnetic layer is formed, after the non-magnetic coupling layer is formed in a manner similar to that described above, the magnetic layer is formed in a manner similar to that described above. In this case, the second magnetic layer is formed so as to attain a thickness of 2 to 10 nm, and the third magnetic layer is formed so as to attain a thickness of 15 to 40 nm.

When an orientation-regulating film is provided between the substrate and the non-magnetic undercoat layer, or when an adhesive layer is provided between the non-metallic substrate and the orientation-regulating film, in a manner similar to that described above, the orientation-regulating film or the adhesive layer is formed through sputtering by use of a sputtering target containing, as a raw material, a component constituting the film or layer.

The protective film is formed through a conventionally known technique, such as sputtering or plasma CVD.

The lubrication layer is formed through a conventionally known technique, such as spin coating or dipping.

The magnetic recording medium produced through the production process of the present invention includes a non-magnetic substrate, a non-magnetic undercoat layer, a plurality of magnetic layers, and a protective film, wherein at least one non-magnetic coupling layer is provided above the non-magnetic undercoat layer, a first magnetic layer is provided beneath the non-magnetic coupling layer and a second magnetic layer is provided atop the non-magnetic coupling layer, and the first magnetic layer is formed of an alloy selected from among a CoRu-based alloy, a CoRe-based alloy, a CoIr-based alloy, and a CoOs-based alloy. Therefore, the magnetic recording medium is suitable for attaining high recording density.

In the production process of the present invention, layers are formed through DC or RF magnetron sputtering by use of sputtering targets containing materials having the same compositions as the respective layers. Therefore, the production process can readily produce a magnetic recording medium including a non-magnetic undercoat layer; at least one non-magnetic coupling layer provided above the non-magnetic undercoat layer; and magnetic layers provided atop and beneath the non-magnetic coupling layer, wherein a first magnetic layer (i.e., a magnetic layer close to the non-magnetic substrate) is formed of an alloy selected from among a CoRu-based alloy, a CoRe-based alloy, a CoIr-based alloy, and a CoOs-based alloy.

EXAMPLES

The present invention will next be described in detail by way of Examples, which should not be interpreted as limiting the scope of the present invention. Unless indicated otherwise, all amounts are atomic percent (at %).

Example 1

An NiP film (thickness: 12 μm) was formed through electroless plating on an aluminum alloy substrate (outer diameter: 95 mm, inner diameter: 25 mm, thickness: 1.270 mm), and the NiP-plated substrate was subjected to texturing, so as to attain an average surface roughness (Ra) of 0.5 nm. The resultant substrate was employed as a non-magnetic substrate. The substrate was placed in a DC magnetron sputtering apparatus (Model: C3010, product of ANELVA CORPORATION, Japan). After the apparatus was evacuated to $2 \times 10^{-7}$ Torr ($2.7 \times 10^{-5}$ Pa), the substrate was heated to 250° C. A non-magnetic undercoat layer (thickness: 50 Å) was formed by use of a target containing Cr, and subsequently a CrW alloy layer (thickness: 20 Å) was formed by use of a target containing a CrW alloy (Cr: 80 at %, W: 20 at %). A CoRu alloy layer (thickness: 15 Å) serving as a first magnetic layer was formed by use of a target containing a CoRu alloy (Co15Ru, Co content: 85 at %, Ru content: 15 at %) (Throughout the specification, when a number appears before an element in an alloy, the number represents the atomic percent of that element in the alloy, with the remainder of the alloy being made of the remaining element). A non-magnetic coupling layer (thickness: 8 Å) was formed by use of a target containing Ru. A CoCrPtB alloy layer (thickness: 200 Å) serving as a second magnetic layer was formed by use of a target containing a CoCrPtB alloy (Co content: 60 at %, Cr content: 22 at %, Pt content: 12 at %, B content: 6 at %), and a carbon protective film (thickness: 50 Å) was formed. During formation of the layers and film, Ar pressure was regulated to 3 mTorr. A lubrication layer (thickness: 20 Å) was formed through application, by means of dipping, of a lubricant containing perfluoropolyether.

Thereafter, the thus-produced magnetic recording media were subjected to a glide test at a glide height of 0.4 μinch by use of a glide tester, and recording and reproduction characteristics of the magnetic recording medium which had passed the glide test were evaluated by use of read/write analyzer RWA1632 (product of Guzik Technical Enterprises, USA). In order to evaluate recording and reproduction characteristics, the analyzer measured read-write conversion characteristics, including reproduction output signal (TAA), half power width of isolated read pulse (PW50), SNR, and overwrite characteristics (OW). Recording and reproduction characteristics were evaluated by use of a complex-type thin film magnetic recording head containing a giant magnetoresistive (GMR) element at the reproduction section. Recording of pattern signals was performed at 500 KFCl, and integration noise was measured at a frequency falling within a range of 1 MHz and a frequency corresponding to 500 kFCl. Reproduction output was measured at 250 kFCl, and SNR was calculated by use of the following equation: SNR=20×log(reproduction output/integration noise as measured at a frequency falling within a range of 1 MHz and a frequency corresponding to 500 kFCl). In order to obtain signal decay, reproduction output was measured at 80° C. and at 1 second, 10 seconds, and 100 seconds after initial measurement of the reproduction output, and on the basis of the thus-obtained results, reduction of reproduction output with passage of 10 years was calculated. Signal decay (dB/decade) is an index for expressing reduction of reproduction output (dB) with passage of 10 years. The lower the signal decay, the more excellent the noise characteristics of the magnetic recording medium. Coercive force (Hc), squareness ratio (S*), and Hex were measured by use of a Kerr-effect-type magnetic characteristic measurement apparatus (model: RO1900, product of Hitachi Electronics Engineering Co., Ltd.). The evaluation results are shown in Table 1.

Example 2

The procedure of Example 1 was repeated, except that a first magnetic layer (thickness: 10 Å) was formed by use of a target containing a CoRu alloy (Co20Ru) in place of a target containing the CoRu alloy (Co15Ru).

Example 3

The procedure of Example 1 was repeated, except that a first magnetic layer (thickness: 15 Å) was formed by use of a target containing a CoRu alloy (Co20Ru) in place of a target containing the CoRu alloy (Co15Ru).

Example 4

The procedure of Example 1 was repeated, except that a first magnetic layer (thickness: 25 Å) was formed by use of a target containing a CoRu alloy (Co20Ru) in place of a target containing the CoRu alloy (Co15Ru).

Example 5

The procedure of Example 1 was repeated, except that a first magnetic layer (thickness: 20 Å) was formed by use of a target containing a CoRu alloy (Co25Ru) in place of a target containing the CoRu alloy (Co15Ru).

Example 6

The procedure of Example 1 was repeated, except that a first magnetic layer (thickness: 15 Å) was formed by use of a target containing a CoRe alloy (Co15Re) in place of a target containing the CoRu alloy (Co15Ru).

Example 7

The procedure of Example 1 was repeated, except that a first magnetic layer (thickness: 20 Å) was formed by use of a target containing a CoRe alloy (Co20Re) in place of a target containing the CoRu alloy (Co15Ru).

Example 8

The procedure of Example 1 was repeated, except that a first magnetic layer (thickness: 20 Å) was formed by use of a target containing a CoRe alloy (Co25Re) in place of a target containing the CoRu alloy (Co15Ru).

Example 9

The procedure of Example 1 was repeated, except that a first magnetic layer (thickness: 15 Å) was formed by use of a target containing a CoIr alloy (Co15Ir) in place of a target containing the CoRu alloy (Co15Ru).

Example 10

The procedure of Example 1 was repeated, except that a first magnetic layer (thickness: 20 Å) was formed by use of a target containing a CoIr alloy (Co20Ir) in place of a target containing the CoRu alloy (Co15Ru).

Example 11

The procedure of Example 1 was repeated, except that a first magnetic layer (thickness: 20 Å) was formed by use of a target containing a CoIr alloy (Co25Ir) in place of a target containing the CoRu alloy (Co15Ru).

Example 12

The procedure of Example 1 was repeated, except that a first magnetic layer (thickness: 15 Å) was formed by use of a target containing a CoOs alloy (Co15Os) in place of a target containing the CoRu alloy (Co15Ru).

Example 13

The procedure of Example 1 was repeated, except that a first magnetic layer (thickness: 20 Å) was formed by use of a target containing a CoOs alloy (Co20Os) in place of a target containing the CoRu alloy (Co15Ru).

Example 14

A glass substrate (outer diameter: 65 mm, inner diameter: 20 mm, thickness: 0.635 mm, surface roughness: 3 Å) serving as a non-magnetic substrate was placed in a DC magnetron sputtering apparatus (Model: C3010, product of ANELVA). After the apparatus was evacuated to $2 \times 10^{-7}$ Torr ($2.7 \times 10^{-5}$ Pa), the substrate was heated to 250° C. A non-magnetic undercoat layer (thickness: 300 Å) was formed by use of a target containing an RuAl alloy (Ru: 50 at %, Al: 50 at %), and subsequently a CrTi alloy layer (thickness: 50 Å) was formed by use of a target containing a CrTi alloy (Cr: 80 at %, Ti: 20 at %). A CoRu alloy layer (thickness: 20 Å) serving as a first magnetic layer was formed by use of a target containing a CoRu alloy (Co20Ru, Co content: 80 at %, Ru content: 20 at %). A non-magnetic coupling layer (thickness: 8 Å) was formed by use of a target containing Ru. A CoCrPtB alloy layer (thickness: 200 Å) serving as a second magnetic layer was formed by use of a target containing a CoCrPtB alloy (Co: 60 at %, Cr: 22 at %, Pt: 12 at %, B: 6 at %), and a carbon protective film (thickness: 50 Å) was formed. During formation of the layers and film, Ar pressure was regulated to 3 mtorr. A lubrication layer (thickness: 20 Å) was formed through application, by means of dipping, of a lubricant containing perfluoropolyether.

Example 15

The procedure of Example 14 was repeated, except that a first magnetic layer (thickness: 20 Å) was formed by use of a target containing a CoRe alloy (Co20Re) in place of a target containing the CoRu alloy (Co20Ru).

Example 16

The procedure of Example 14 was repeated, except that a first magnetic layer (thickness: 20 Å) was formed by use of a target containing a CoIr alloy (Co20Ir) in place of a target containing the CoRu alloy (Co20Ru).

Example 17

The procedure of Example 14 was repeated, except that a first magnetic layer (thickness: 20 Å) was formed by use of a target containing a CoOs alloy (Co20Os) in place of a target containing the CoRu alloy (Co20Ru).

Example 18

The procedure of Example 1 was repeated, except that the thickness of a second magnetic layer was changed to 30 Å, another non-magnetic coupling layer (thickness: 8 Å) was formed directly on the second magnetic layer by use of a target containing Ru, and a CoCrPtB alloy layer (thickness: 200 Å) serving as a third magnetic layer was formed by use of a target containing a CoCrPtB alloy (Co: 60 at %, Cr: 22 at %, Pt: 12 at %, B: 6 at %).

Comparative Example 1

An NiP film (thickness: 12 μm) was formed through electroless plating on an aluminum alloy substrate (outer diameter: 95 mm, inner diameter: 25 mm, thickness: 1.270 mm), and the NiP-plated substrate was subjected to texturing, so as to attain an average surface roughness (Ra) of 0.5 nm. The resultant substrate was employed as a non-magnetic substrate. The substrate was placed in a DC magnetron sputtering apparatus (Model: C3010, product of ANELVA). After the apparatus was evacuated to $2 \times 10^{-7}$ Torr (2.7×10⁻⁵ Pa), the substrate was heated to 250° C. A non-magnetic undercoat layer (thickness: 50 Å) was formed by use of a target containing Cr, and subsequently a CrW alloy layer (thickness: 20 Å) was formed by use of a target containing a CrW alloy (Cr: 80 at %, W: 20 at %). Subsequently, a CoCr alloy layer (thickness: 15 Å) serving as a non-magnetic intermediate layer was formed by use of a target containing a CoCr alloy (Co: 65 at %, Cr: 35 at %). A CoCrPtB alloy layer (thickness: 20 Å) serving as a first magnetic layer was formed by use of a target containing a CoCrPtB alloy (Co: 60 at %, Cr: 22 at %, Pt: 12 at %, B: 6 at %). A non-magnetic coupling layer (thickness: 8 Å) was formed by use of a target containing Ru. A CoCrPtB alloy layer (thickness: 200 Å) serving as a second magnetic layer was formed by use of a target containing a CoCrPtB alloy (Co: 60 at %, Cr: 22 at %, Pt: 12 at %, B: 6 at %), and a carbon protective film (thickness: 50 Å) was formed. During formation of the layers and film, Ar pressure was regulated to 3 mTorr. A lubrication layer (thickness: 20 Å) was formed through application, by means of dipping, of a lubricant containing perfluoropolyether.

Comparative Example 2

The procedure of Comparative Example 1 was repeated, except that a first magnetic layer (thickness: 40 Å) was formed by use of a target containing a CoCrPtB alloy (Co: 60 at %, Cr: 22 at %, Pt: 12 at %, B: 6 at %).

Comparative Example 3

The procedure of Comparative Example 1 was repeated, except that a first magnetic layer (thickness: 60 Å) was formed by use of a target containing a CoCrPtB alloy (Co: 60 at %, Cr: 22 at %, Pt: 12 at %, B: 6 at %).

Comparative Example 4

The procedure of Example 1 was repeated, except that a first magnetic layer (thickness: 40 Å) was formed by use of a target containing a CoRu alloy (Co20Ru) in place of a target containing the CoRu alloy (Co15Ru).

Comparative Example 5

The procedure of Example 1 was repeated, except that a first magnetic layer (thickness: 60 Å) was formed by use of a target containing a CoRu alloy (Co20Ru) in place of a target containing the CoRu alloy (Co15Ru).

Comparative Example 6

The procedure of Example 1 was repeated, except that a first magnetic layer (thickness: 20 Å) was formed by use of a target containing a CoRu alloy (Co40Ru) in place of a target containing the CoRu alloy (Co15Ru).

Comparative Example 7

The procedure of Example 1 was repeated, except that a first magnetic layer (thickness: 20 Å) was formed by use of a target containing a CoRe alloy (Co40Re) in place of a target containing the CoRu alloy (Co15Ru).

Comparative Example 8

The procedure of Example 1 was repeated, except that a first magnetic layer (thickness: 20 Å) was formed by use of a target containing a CoIr alloy (Co40Ir) in place of a target containing the CoRu alloy (Co15Ru).

Comparative Example 9

The procedure of Example 1 was repeated, except that a first magnetic layer (thickness: 20 Å) was formed by use of a target containing a CoOs alloy (Co40Os) in place of a target containing the CoRu alloy (Co15Ru).

Comparative Example 10

A glass substrate (outer diameter: 65 mm, inner diameter: 20 mm, thickness: 0.635 mm, surface roughness: 3 Å) serving as a non-magnetic substrate was placed in a DC magnetron sputtering apparatus (Model: C3010, product of ANELVA). After the apparatus was evacuated to 2×10⁻⁷ Torr (2.7×10⁻⁵ Pa), the substrate was heated to 250° C. A non-magnetic undercoat layer (thickness: 300 Å) was formed by use of a target containing an RuAl alloy (Ru: 50 at %, Al: 50 at %), and subsequently a CrTi alloy layer (thickness: 50 Å) was formed by use of a target containing a CrTi alloy (Cr: 80 at %, Ti: 20 at %). Subsequently, a CoCr alloy layer (thickness: 15 Å) serving as a non-magnetic intermediate layer was formed by use of a target containing a CoCr alloy (Co: 65 at %, Cr: 35 at %). A CoCrPtB alloy layer (thickness: 20 Å) serving as a first magnetic layer was formed by use of a target containing a CoCrPtB alloy (Co: 60 at %, Cr: 22 at %, Pt: 12 at %, B: 6 at %). A non-magnetic coupling layer (thickness: 8 Å) was formed by use of a target containing Ru. A CoCrPtB alloy layer (thickness: 200 Å) serving as a second magnetic layer was formed by use of a target containing a CoCrPtB alloy (Co: 60 at %, Cr: 22 at %, Pt: 12 at %, B: 6 at %), and a carbon protective film (thickness: 50 Å) was formed. During formation of the layers and film, Ar pressure was regulated to 3 mTorr. A lubrication layer (thickness: 20 Å) was formed through application, by means of dipping, of a lubricant containing perfluoropolyether.

Comparative Example 11

The procedure of Comparative Example 10 was repeated, except that a first magnetic layer (thickness: 40 Å) was formed by use of a target containing a CoCrPtB alloy (Co: 60 at %, Cr: 22 at %, Pt: 12 at %, B: 6 at %).

Comparative Example 12

The procedure of Comparative Example 10 was repeated, except that a first magnetic layer (thickness: 60 Å) was formed by use of a target containing a CoCrPtB alloy (Co: 60 at %, Cr: 22 at %, Pt: 12 at %, B: 6 at %).

Comparative Example 13

The procedure of Comparative Example 1 was repeated, except that the thickness of a second magnetic layer was changed to 30 Å, another non-magnetic coupling layer (thickness: 8 Å) was formed directly on the second magnetic layer by use of a target containing Ru, and a CoCrPtB alloy layer (thickness: 200 Å) serving as a third magnetic layer was formed by use of a target containing a CoCrPtB alloy (Co: 60 at %, Cr: 22 at %, Pt: 12 at %, B: 6 at %).

The above-produced magnetic recording media were subjected to evaluation in terms of various characteristics in a manner similar to that of Example 1. The evaluation results are shown in Table 1.

Table 2 shows lattice constants of the aforementioned respective layers.

TABLE 1

|  | Coercive force (Oe) | Squareness ratio | TAA (μV) | OW (dB) | PW50 (ns) | SNR (dB) | Signal decay (dB/decade) | Hex (Oe) |
|---|---|---|---|---|---|---|---|---|
| Ex. 1 | 4521 | 0.79 | 1453 | 38.3 | 9.34 | 18.1 | −0.04 | 1245 |
| Ex. 2 | 4424 | 0.78 | 1525 | 39.2 | 9.51 | 18.0 | −0.06 | 1658 |
| Ex. 3 | 4631 | 0.82 | 1545 | 37.5 | 9.43 | 18.2 | −0.05 | 1432 |
| Ex. 4 | 4721 | 0.82 | 1490 | 37.3 | 9.40 | 18.3 | −0.04 | 1063 |
| Ex. 5 | 4645 | 0.81 | 1567 | 38.3 | 9.44 | 17.7 | −0.05 | 1326 |
| Ex. 6 | 4629 | 0.82 | 1537 | 39.2 | 9.38 | 18.3 | −0.04 | 1263 |
| Ex. 7 | 4824 | 0.83 | 1570 | 39.5 | 9.41 | 18.4 | −0.04 | 1481 |
| Ex. 8 | 4780 | 0.82 | 1551 | 39.3 | 9.44 | 18.2 | −0.05 | 1630 |
| Ex. 9 | 4491 | 0.79 | 1478 | 39.2 | 9.45 | 17.8 | −0.05 | 1349 |
| Ex. 10 | 4587 | 0.81 | 1529 | 38.4 | 9.49 | 17.9 | −0.06 | 1431 |
| Ex. 11 | 4417 | 0.80 | 1531 | 38.5 | 9.53 | 17.7 | −0.06 | 1543 |
| Ex. 12 | 4521 | 0.79 | 1492 | 38.8 | 9.47 | 17.9 | −0.05 | 1236 |
| Ex. 13 | 4576 | 0.80 | 1538 | 38.6 | 9.51 | 17.8 | −0.06 | 1421 |
| Ex. 14 | 4324 | 0.77 | 1225 | 41.5 | 10.25 | 16.2 | −0.07 | 1533 |
| Ex. 15 | 4425 | 0.79 | 1264 | 42.6 | 10.21 | 16.4 | −0.06 | 1532 |
| Ex. 16 | 4398 | 0.78 | 1219 | 42.1 | 10.35 | 16.1 | −0.07 | 1437 |
| Ex. 17 | 4375 | 0.77 | 1234 | 41.5 | 10.29 | 16.0 | −0.07 | 1386 |
| Ex. 18 | 4353 | 0.80 | 1524 | 35.7 | 9.50 | 17.8 | −0.04 | 1209 |
| Comp. Ex. 1 | 4152 | 0.76 | 1521 | 38.2 | 9.80 | 17.2 | −0.09 | 564 |
| Comp. Ex. 2 | 4192 | 0.77 | 1391 | 40.1 | 9.72 | 17.6 | −0.06 | 476 |
| Comp. Ex. 3 | 4131 | 0.77 | 1124 | 41.8 | 9.67 | 18.1 | −0.04 | 397 |
| Comp. Ex. 4 | 4621 | 0.81 | 1383 | 38.6 | 9.35 | 18.3 | −0.03 | 740 |
| Comp. Ex. 5 | 4582 | 0.80 | 1150 | 40.1 | 9.31 | 18.5 | −0.02 | 543 |
| Comp. Ex. 6 | 3945 | 0.75 | 1457 | 43.1 | 10.25 | 15.6 | −0.12 | Unmeasurable |
| Comp. Ex. 7 | 3489 | 0.74 | 1491 | 44.2 | 10.41 | 16.2 | −0.13 | Unmeasurable |
| Comp. Ex. 8 | 3783 | 0.73 | 1431 | 42.5 | 10.37 | 15.7 | −0.14 | Unmeasurable |
| Comp. Ex. 9 | 3245 | 0.74 | 1463 | 43.6 | 10.41 | 15.4 | −0.13 | Unmeasurable |
| Comp. Ex. 10 | 3891 | 0.73 | 1239 | 43.1 | 10.45 | 15.4 | −0.12 | 534 |
| Comp. Ex. 11 | 3842 | 0.74 | 1109 | 44.5 | 10.32 | 15.7 | −0.09 | 443 |
| Comp. Ex. 12 | 3840 | 0.74 | 989 | 45.1 | 10.24 | 16.1 | −0.06 | 390 |
| Comp. Ex. 13 | 4025 | 0.75 | 1623 | 36.5 | 9.90 | 17.0 | −0.07 | 512 |

TABLE 2

| Composition of layer | Lattice constant | |
|---|---|---|
|  | a-axis | c-axis |
| Co15Ru | 0.254 | 0.410 |
| Co20Ru | 0.255 | 0.411 |
| Co25Ru | 0.257 | 0.413 |
| Co40Ru | 0.259 | 0.415 |
| Co15Re | 0.255 | 0.413 |
| Co20Re | 0.255 | 0.415 |
| Co25Re | 0.256 | 0.419 |
| Co40Re | 0.259 | 0.422 |
| Co15Ir | 0.254 | 0.410 |
| Co20Ir | 0.255 | 0.411 |
| Co25Ir | 0.257 | 0.413 |
| Co40Ir | 0.259 | 0.416 |
| Co15Os | 0.254 | 0.410 |
| Co20Os | 0.255 | 0.412 |
| Co25Os | 0.257 | 0.413 |
| Co40Os | 0.259 | 0.417 |

The results show the following. As compared with the magnetic recording medium of Comparative Example 1, the magnetic recording media of Examples 1 through 13 exhibited high coercive force and excellent SNR, signal decay, and Hex. The magnetic recording media of Comparative Examples 2 through 4, in which the thickness of the first magnetic layer was increased, exhibited improved signal decay, but lowered output and Hex. The magnetic recording media of Comparative Examples 6 through 9 exhibited poor coercive force, output, SNR, and signal decay, since virtually no magnetization of the CoRu-based alloy, CoRe-based alloy, CoIr-based alloy, and CoOs-based alloy occurred in these media. The Hex of each of the magnetic recording media of Comparative Examples 6 through 9 was unmeasurable, because virtually no magnetization occurred. Since the magnetic recording media of Examples 14 through 17 are isotropic media, they exhibited poor characteristics as compared with the magnetic recording media of the other Examples. However, as compared with the magnetic recording medium of Comparative Example 10, which is an isotropic medium, the magnetic recording media of Examples 14 through 17 exhibited high coercive force and excellent SNR, signal decay, and Hex. The magnetic recording media of Comparative Examples 11 and 12 (isotropic media), in which the thickness of the first magnetic layer was increased, exhibited improved signal decay, but lowered output and Hex.

The magnetic recording medium of the present invention includes a non-magnetic undercoat layer; at least one non-magnetic coupling layer provided above the non-magnetic undercoat layer; and magnetic layers provided atop and beneath the non-magnetic coupling layer, wherein a first magnetic layer (i.e., a magnetic layer close to a non-magnetic substrate) is formed of an alloy selected from among a CoRu-based alloy, a CoRe-based alloy, a CoIr-based alloy, and a CoOs-based alloy. Therefore, even when the thickness of the first magnetic layer is reduced, the magnetic recording medium exhibits high coercive force and squareness ratio, and improved thermal stability without causing lowering of output. That is, the magnetic recording medium is suitable for attaining high recording density.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic substrate, a non-magnetic undercoat layer, a plurality of magnetic layers, and a protective film, wherein at least one non-magnetic coupling layer is provided above the non-magnetic undercoat layer, a first magnetic layer is provided in contact with and beneath the non-magnetic coupling layer and a second magnetic layer is provided atop the non-magnetic coupling layer, and the first magnetic layer is formed of an alloy selected from the group consisting of a CoRu-based alloy containing 5 to 25 at % Ru, a CoRe-based alloy, a CoIr-based alloy, and a CoOs-based alloy, and wherein the alloy constituting the first magnetic layer has a lattice constant a of 0.25 nm to 0.26 nm and a lattice constant c of 0.407 nm to 0.422 nm.

2. A magnetic recording medium according to claim 1, wherein, in the alloy constituting the first magnetic layer, transition from an hcp structure to an fcc structure occurs at a temperature of at least 600° C.

3. A magnetic recording medium according to claim 1, wherein, when the first magnetic layer is formed of a CoRu-based alloy, the Ru content is 15 to 25 at %; when the first magnetic layer is formed of a CoRe-based alloy, the Re content is 5 to 30 at %; when the first magnetic layer is formed of a CoIr-based alloy, the Ir content is 8 to 30 at %; and when the first magnetic layer is formed of a CoOs-based alloy, the Os content is 5 to 30 at %.

4. A magnetic recording medium according to claim 1, wherein the first magnetic layer has a thickness of 0.5 to 3 nm.

5. A magnetic recording medium according to claim 1, wherein the non-magnetic coupling layer is formed of a substance selected from the group consisting of Ru, Rh, Ir, Cr, Re, an Ru-based alloy, an Rh-based alloy, an Ir-based alloy, a Cr-based alloy, and an Re-based alloy; and has a thickness of 0.5 to 1.5 nm.

6. A magnetic recording medium according to claim 1, which exhibits magnetic anisotropy in a circumferential direction of the non-magnetic substrate, wherein the non-magnetic undercoat layer has a multi-layer structure including a layer formed of Cr or a Cr alloy containing Cr and one or more elements selected from the group consisting of Ti, Mo, Al, Ta, W, Ni, B, Si, and V.

7. A magnetic recording medium according to claim 1, which exhibits magnetic isotropy along a longitudinal direction of the non-magnetic substrate, wherein the non-magnetic undercoat layer has a multi-layer structure including a layer formed of an NiAl-based alloy, an RuAl-based alloy, or a Cr alloy containing Cr and one or more elements selected from the group consisting of Ti, Mo, Al, Ta, W, Ni, B, Si, and V.

8. A magnetic recording medium according to claim 1, wherein the non-magnetic substrate is a substrate selected from the group consisting of a glass substrate and a silicon substrate.

9. A magnetic recording medium according to claim 1, wherein the non-magnetic substrate is obtained through NiP plating of the surface of a substrate selected from the group consisting of an Al substrate, a glass substrate, and a silicon substrate.

10. A magnetic recording medium according to claim 1, wherein the second magnetic layer or a third magnetic layer is formed of an alloy selected from the group consisting of a CoCrPt-based alloy, a CoCrPtTa-based alloy, a CoCrPtB-based alloy, and a CoCrPtBY-based alloy, wherein Y is at least one element selected from the group consisting of Ta and Cu.

11. A process for producing a magnetic recording medium, which comprises a step of forming a non-magnetic undercoat layer on a non-magnetic substrate, a step of forming a protective film, a step of forming at least one non-magnetic coupling layer above the non-magnetic undercoat layer; a step of forming a first magnetic layer in contact with the at least one non-magnetic coupling layer and containing an alloy selected from the group consisting of a CoRu-based alloy containing 5 to 25 at % Ru, a CoRe-based alloy, a CoIr-based alloy, and a CoOs-based alloy, wherein the alloy constituting the first magnetic layer has a lattice constant a of 0.25 nm to 0.26 nm and a lattice constant c of 0.407 nm to 0.422 nm , and wherein the step of forming the first magnetic layer is performed before the step of forming at least one non-magnetic coupling layer; and a step of forming a second magnetic layer, the step of forming the second magnetic layer being performed after the step of forming at least one non-magnetic coupling layer.

12. A magnetic recording and reproducing apparatus comprising a magnetic recording medium and a magnetic head for recording data onto the medium and reproducing the data therefrom, wherein the magnetic recording medium is a magnetic recording medium as recited in claim 1.

* * * * *